United States Patent
Won et al.

(10) Patent No.: US 9,106,895 B2
(45) Date of Patent: Aug. 11, 2015

(54) MULTIDIMENSIONAL LAYER SENDING-AND-RECEIVING DEVICE AND METHOD FOR STEREOSCOPIC THREE-DIMENSIONAL VIDEO DATA

(75) Inventors: Seok Ho Won, Daejeon (KR); Jai Hyung Cho, Daejeon (KR); Jong Soo Lim, Daejeon (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 313 days.

(21) Appl. No.: 13/820,479

(22) PCT Filed: Aug. 18, 2011

(86) PCT No.: PCT/KR2011/006059
§ 371 (c)(1),
(2), (4) Date: Mar. 1, 2013

(87) PCT Pub. No.: WO2012/023807
PCT Pub. Date: Feb. 23, 2012

(65) Prior Publication Data
US 2013/0188014 A1    Jul. 25, 2013

(30) Foreign Application Priority Data

| Aug. 20, 2010 | (KR) | 10-2010-0081080 |
| Sep. 17, 2010 | (KR) | 10-2010-0092101 |
| Oct. 12, 2010 | (KR) | 10-2010-0099138 |
| Oct. 28, 2010 | (KR) | 10-2010-0105944 |
| Jul. 4, 2011 | (KR) | 10-2011-0065856 |

(51) Int. Cl.
*H04N 13/00* (2006.01)
*H04N 21/2343* (2011.01)
*H04N 21/2365* (2011.01)
*H04N 21/236* (2011.01)
*H04N 7/52* (2011.01)
*H04N 19/597* (2014.01)

(52) U.S. Cl.
CPC ....... *H04N 13/0059* (2013.01); *H04N 21/2365* (2013.01); *H04N 21/234327* (2013.01); *H04N 7/52* (2013.01); *H04N 19/597* (2013.01); *H04N 21/236* (2013.01)

(58) Field of Classification Search
CPC . H04N 13/0239; H04N 13/0055; H04N 7/52; H04N 21/236
USPC .................................. 348/42, 43; 375/240.1
See application file for complete search history.

(56) References Cited

U.S. PATENT DOCUMENTS

| 2008/0252720 A1* | 10/2008 | Kim et al. ........................ 348/59 |
| 2009/0042511 A1 | 2/2009 | Malladi |
| 2009/0222855 A1 | 9/2009 | Vare et al. |
| 2011/0149019 A1* | 6/2011 | Kellerman et al. ............. 348/42 |

FOREIGN PATENT DOCUMENTS

| KR | 1020080053194 A | 12/2008 |
| KR | 1020090125080 A | 3/2009 |
| KR | 1020100072722 A | 1/2010 |

OTHER PUBLICATIONS

Korean Intellectual Property Office, International Search Report and Written Opinion, including English translation of the International Search Report, in connection with related PCT Application No. PCT/KR2011/006059, dated Mar. 28, 2012, 2 pages.

* cited by examiner

*Primary Examiner* — Farzana Hossain
(74) *Attorney, Agent, or Firm* — H.C. Park & Associates, PLC

(57) ABSTRACT

Provided is a multi-dimensional layered modulation transmitting and receiving apparatus and method for stereoscopic three-dimensional (3D) video data. The transmitting apparatus may convert multi-dimensional data to a plurality of stream data by mapping the multi-dimensional data to a complex number plane, and may transmit the plurality of stream data by mapping the plurality of stream data to dimensions divided based on a time and a space, respectively. The receiving apparatus may determine a signal strength of received signal, a performance, a power mode, may determine a service image corresponding to the signal strength, the performance, the power mode, may determine a dimension corresponding to the service image, and may receive stream data of the determined dimension.

12 Claims, 10 Drawing Sheets

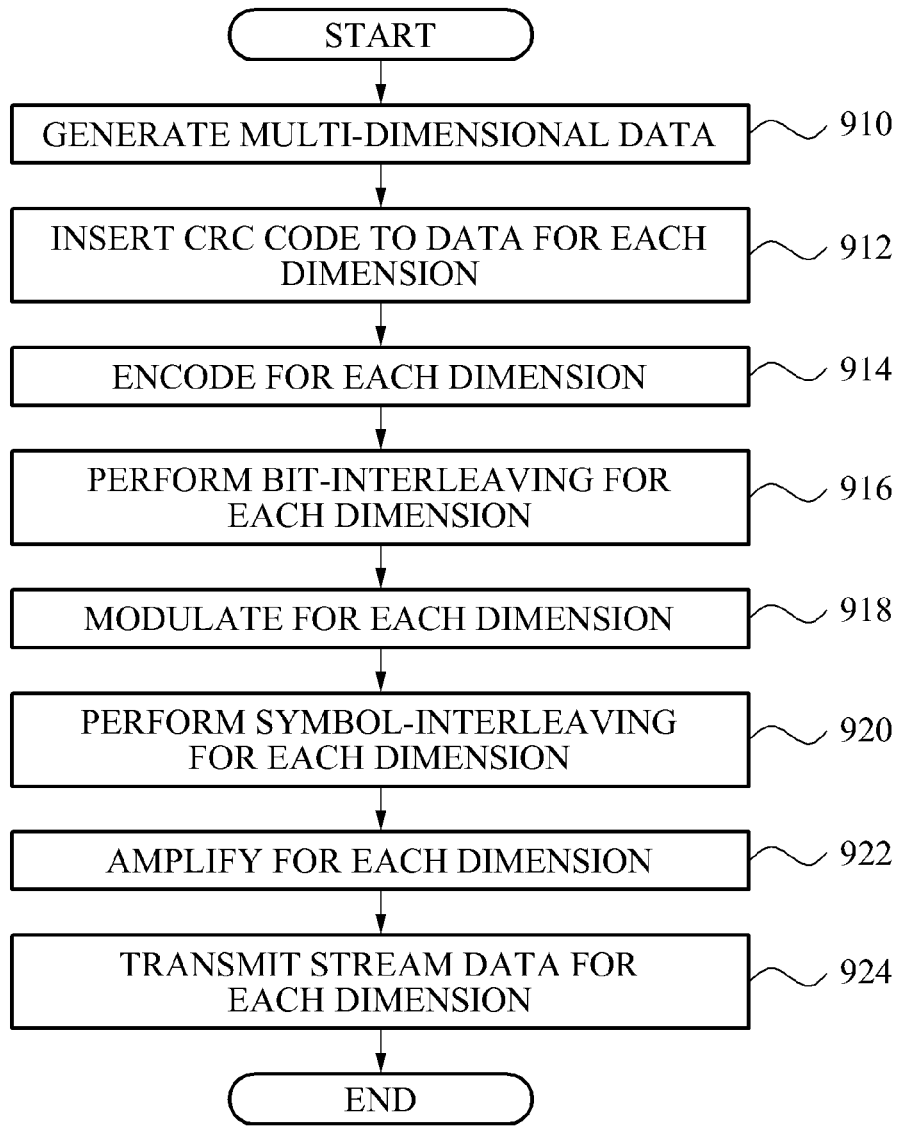

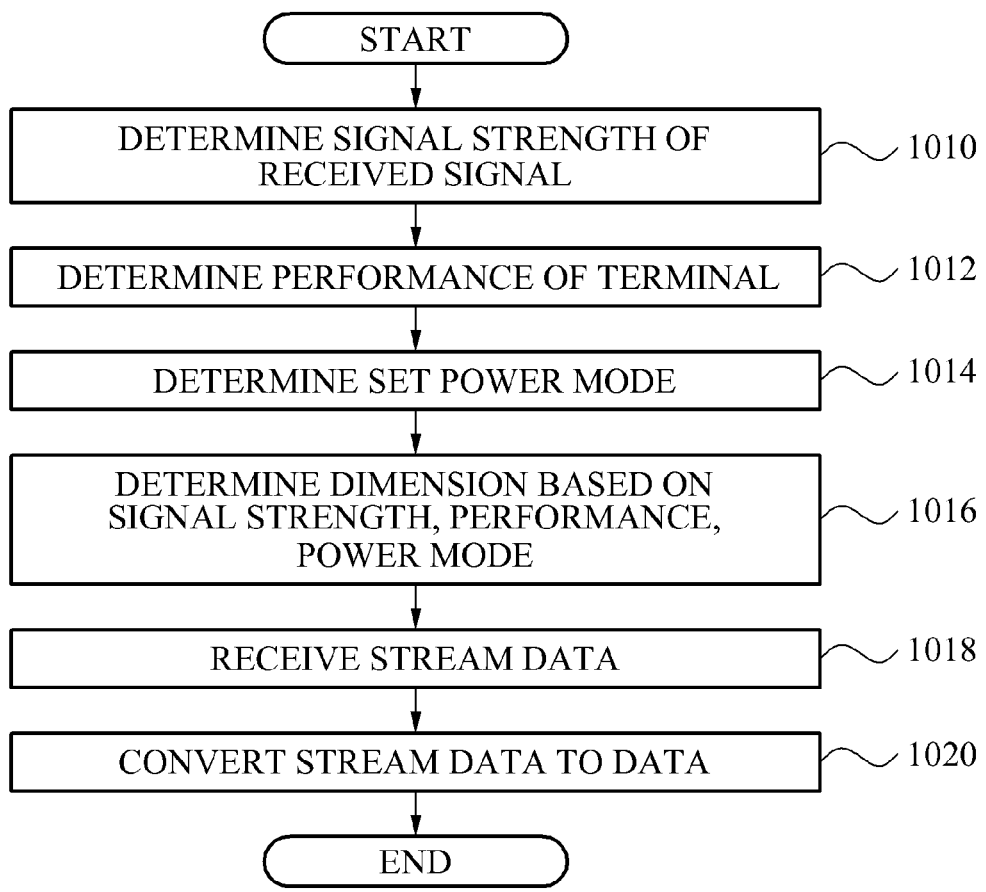

MULTIDIMENSIONAL LAYER SENDING-AND-RECEIVING DEVICE AND METHOD FOR STEREOSCOPIC THREE-DIMENSIONAL VIDEO DATA

TECHNICAL FIELD

The present invention relates to a stereoscopic three-dimensional (3D) video data transmitting method, and more particularly, to a stereoscopic 3D video data transmitting method that utilizes an optimal communication resource so as to provide a maximum service quality and maximum user capacity.

BACKGROUND ART

Recently, three-dimensional (3D) films have been a box office success, as such 3D broadcasting services have garnered a great deal of attention. Varied types of applications for 3D image transmission, for example, 3D games, 3D internet access, 3D video phones, and the like, are expected to be utilized. In this case, a greater amount of communication resources will be required to provide a service associated with multi-view data, for example, two-dimensional (2D) view data, 3D view data, and four-dimensional (4D) view data, and the like. However, the communication resource, particularly, the radio resource, is limited and thus, there is a desire for a method of effectively using an optimal resource.

One of the conventional 3D image transmission methods is a method based on scalable video coding (SVC) image information. According to the method, left view data of stereoscopic 3D video data is mapped to a base layer, and right view data of the stereoscopic 3D video data is mapped to an enhancement layer, or vice versa. The conventional SVC image information may be transmitted based on a layered modulation transmission technology. In this example, a conventional layered modulation transmission technology uses superposed constellations of a 2D complex number plane.

DISCLOSURE OF INVENTION

Technical Goals

An aspect of the present invention provides a multi-dimensional layered modulation transmitting and receiving apparatus and method for stereoscopic three-dimensional (3D) video data.

Another aspect of the present invention also provides a multi-dimensional layered modulation transmitting apparatus that may perform mapping of multi-dimensional data to a complex number plane so as to convert the multi-dimensional data to a plurality of stream data, and may map the plurality of stream data to dimensions divided based on a time and a space so as to transmit the plurality of stream data.

Still another aspect of the present invention also provides a multi-dimensional layered modulation receiving apparatus that may determine a signal strength of a received signal, a performance, and a power mode, may determine a service image corresponding to the signal strength of the received signal, the performance, and the power mode, may determine a dimension corresponding to the service image, and may receive stream data of the determined dimension.

Technical Solutions

According to an aspect of an exemplary embodiment, there is provided a multi-dimensional layered modulation transmitting apparatus for stereoscopic three-dimensional (3D) video data, the apparatus including a data generating unit to generate multi-dimensional data, a stream generating unit to perform mapping of the multi-dimensional data to a complex number plane, and to convert the mapped multi-dimensional data to a plurality of stream data, respectively, and a multi-dimensional transmitting unit to perform mapping of the plurality of stream data to dimensions divided based on a time and a space, respectively, and to transmit the plurality of mapped stream data, and the multi-dimensional data includes at least one two-dimensional (2D) view data.

According to another aspect of an exemplary embodiment, there is provided a multi-dimensional layered modulation receiving apparatus for stereoscopic three-dimensional (3D) video data, the apparatus including a controller to determine a signal strength of a received signal, a performance, a power mode, to determine a service image corresponding to the determined signal strength, the performance, and the power mode, and to determine a dimension corresponding to the service image, a multi-dimensional receiving unit to receive a stream data of the dimension determined by the controller, and a data converter to convert the received stream data to data, and a multi-dimension is divided based on a time, a space, and a complex number plane.

According to still another aspect of an exemplary embodiment, there is provided a multi-dimensional layered modulation transmitting method for stereoscopic three-dimensional (3D) video data, the method including generating multi-dimensional data, converting the multi-dimensional data to a plurality of stream data by mapping the multi-dimensional data to a complex number plane, and transmitting the plurality of stream data by mapping the plurality of stream data to dimensions divided based on a time and a space, respectively, and the multi-dimensional data includes at least one two dimensional (2D) view data.

According to yet another aspect of an exemplary embodiment, there is provided a multi-dimensional layered modulation receiving method for stereoscopic three-dimensional (3D) video data, the method including determining a signal strength of a received signal, determining a performance, determining a power mode, determining a service image corresponding to the signal strength of the received signal, the performance, and the power mode, receiving stream data of a dimension corresponding to the service image from among a plurality of stream data mapped to a multi-dimension, and converting the received stream data to data, and the multi-dimension is divided based on a time, a space, and a complex number plane.

Effect of the Invention

Exemplary embodiments of the present invention may provide a multi-dimensional layered modulation transmitting and receiving apparatus and method for stereoscopic 3D video data, and the transmitting apparatus may simultaneously transmit multi-view data in addition to stereo view data (two-dimensional (2D) view data) in a physical layer, without using an additional radio resource. Therefore, a receiving apparatus with a good channel condition may service a 3D image, and a receiving apparatus with a poor channel condition may service a 2D image. Accordingly, radio resources may be effectively used. Also, multi-dimensional data may be adaptively received based on a signal strength of a received signal, a performance, and a power mode of a terminal.

BRIEF DESCRIPTION OF DRAWINGS

FIG. 9 illustrates a flowchart that describes a process of transmitting multi-dimensional data in a multi-dimensional layered modulation transmitting apparatus according to an embodiment of the present invention; and FIG. 10 illustrates a flowchart that describes a process of receiving multi-dimensional data in a multi-dimensional layered modulation receiving apparatus according to an embodiment of the present invention.

BEST MODE FOR CARRYING OUT THE INVENTION

Figure 1:
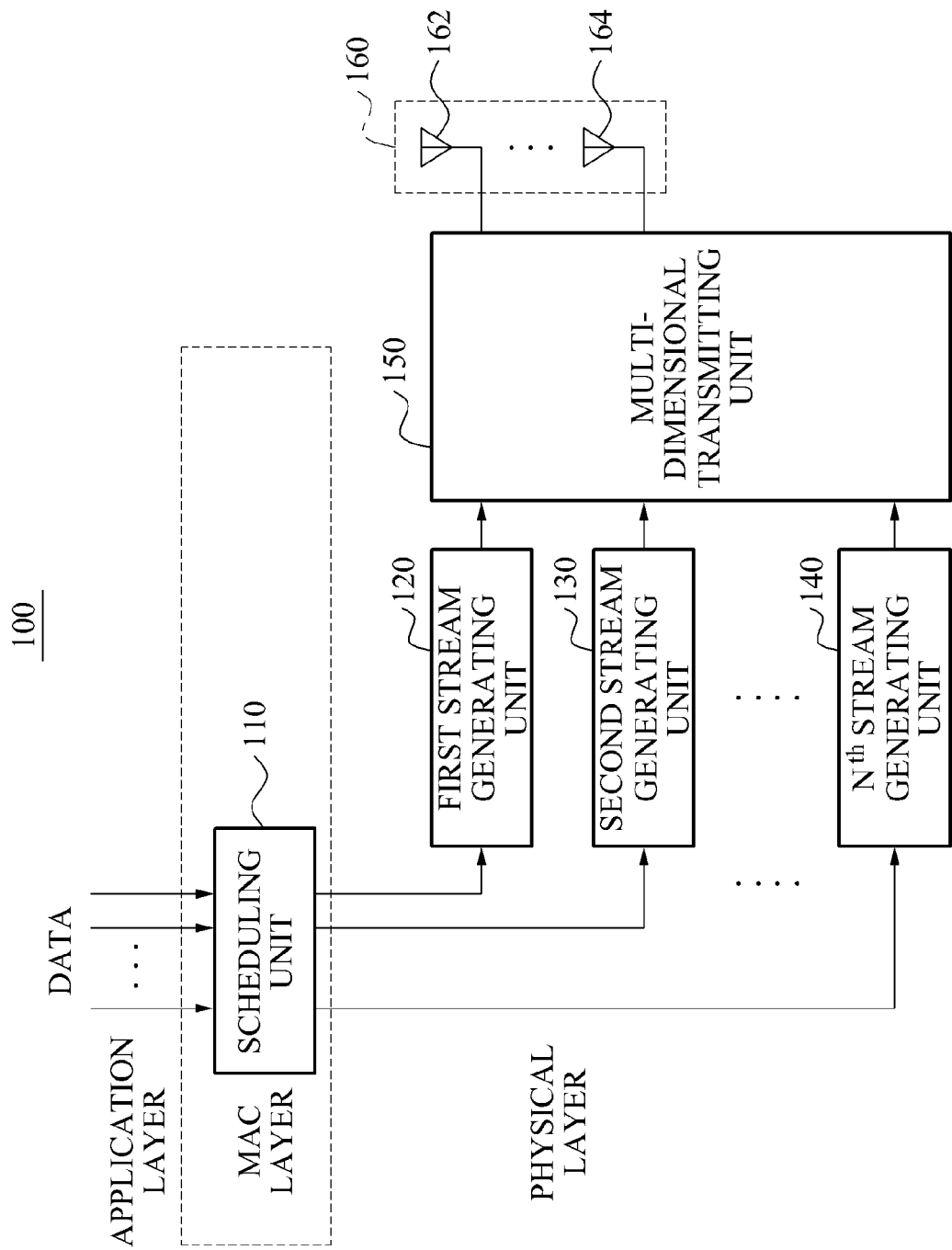
FIG. 1 illustrates a configuration of a multi-dimensional layered modulation transmitting apparatus according to an embodiment of the present invention.

Although a few exemplary embodiments of the present invention have been shown and described, the present invention is not limited to the described exemplary embodiments, wherein like reference numerals refer to the like elements throughout.

FIG. 1 illustrates a configuration of a multi-dimensional layered modulation transmitting apparatus according to an embodiment of the present invention.

Referring to FIG. 1, a multi-dimensional layered modulation transmitting apparatus 100 includes a scheduling unit 110, a first stream generating unit 120, a second stream generating unit 130, an $N^{th}$ stream generating unit 140, a multi-dimensional transmitting unit 150, and a multi-antenna 160.

The scheduling unit 110 may perform scheduling of multi-dimensional data to be transmitted in dimensions, which are received from an application layer, and may provide the scheduled multi-dimensional data to the first stream generating unit 120, the second stream generating unit 130, and the $N^{th}$ stream generating unit 140, so as to be output as a three-dimensional (3D) image. In this example, the multi-dimensional data may include at least one two-dimensional (2D) view data and at least one depth map data. Also, at least one of the multi-dimensional data is data of a base layer, and remaining data is data of an enhancement layer.

The stream generating units 120, 130, and 140 perform mapping of the multi-dimensional data to a complex number plane so as to convert to the multi-dimensional data to a plurality of stream data. Each stream generating unit is configured as shown in FIG. 2.

Figure 2:
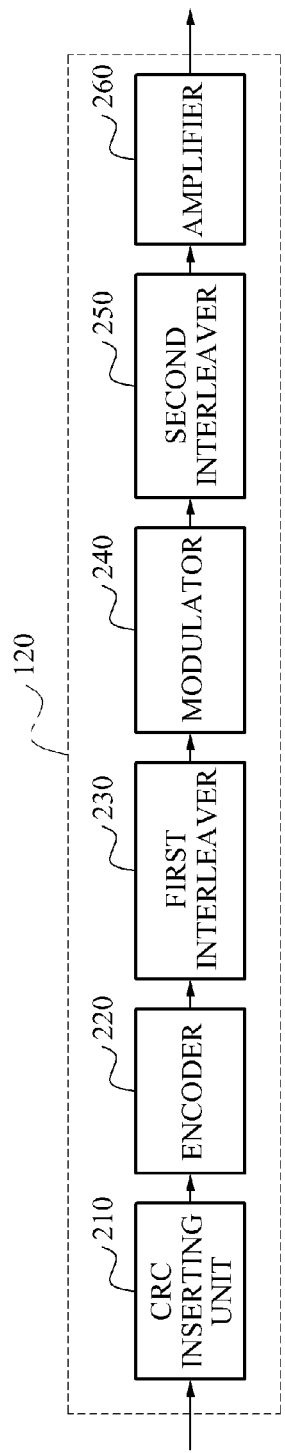
FIG. 2 illustrates a configuration of a stream generating unit in the multi-dimensional layered modulation transmitting apparatus according to an embodiment of the present invention.

FIG. 2 illustrates a configuration of a stream generating unit in a multi-dimensional layered modulation transmitting apparatus according to an embodiment of the present invention.

Referring to FIG. 2, the stream generating unit 120 includes a cyclic redundancy check (CRC) inserting unit 210, an encoder 220, a first interleaver 230, a modulator 240, a second interleaver 250, and an amplifier 260.

The CRC inserting unit 210 may insert a CRC code to received data.

The encoder 220 may encode the CRC-inserted data.

The first interleaver 230 may interleave the encoded data. In this example, the first interleaver 230 may interleave the encoded data based on a bit unit so as to convert a burst error to a random error and thus, an error may be readily corrected.

The modulator 240 may modulate the bit-interleaved data by mapping the bit-interleaved data to a constellation coordinate.

The second interleaver 250 may perform symbol-interleaving of the modulated data. In this example, the second interleaver 250 may interleave the modulated data based on a symbol unit so as to convert a burst error to a random error and thus, an error may be readily corrected.

The amplifier 260 may amplify the symbol-interleaved data so as to generate stream data for each dimension.

The first interleaver 230 and the second interleaver 250 may be omissible in the stream generating unit 120 of FIG. 2.

Referring again to FIG. 1, the multi-dimensional transmitting unit 150 may transmit the plurality of stream data by mapping the plurality of stream data to dimensions divided based on a time and a space.

The multi-dimensional transmitting unit 150 may divide a time by changing a time of data transmission, may divide a space by changing antennas 162 through 164 included in the multi-antenna 160, and may transmit the plurality of stream data by mapping the plurality of stream data to the dimensions, respectively.

The multi-dimensional transmission according to embodiments of the present invention may refer to transmission performed by mapping a signal to all dimensions that are optimally and simultaneously useable for signal transmission, among dimensions, for example, a complex number plane, a time, a space, and the like. As an example, when signal transmission is performed using a 2D complex number plane, two time sections considered to be 2D, and two transmission antennae considered to be 2D, a signal may be mapped as an eight-dimensional (8D) transmission signal (2×2×2=8) and thus, an 8D transmission may be performed. In the same manner as a layered modulation scheme that transmits different signals in the 2D complex number plane as superposed different layers, a plurality of signals in different dimensions may be more superposed on the same dimension, on demand.

At least two dimensions may be used to transmit a 3D image using the transmitting apparatus 100 of FIG. 1. That is, to transmit the 3D image, either a 2D left view image and a 2D right view image or a 2D image and a depth map image may need to be transmitted.

Even though the transmitting apparatus 100 transmits the 3D image in a multi-dimension, a quality of an image provided by the receiving apparatus may change based on a position of the receiving apparatus, a performance, a power mode that manages power, and the like.

Hereinafter, a reason for a change in the quality of the image provided by the receiving apparatus based on the position of the receiving apparatus will be described with reference to FIG. 3.

Figure 3:
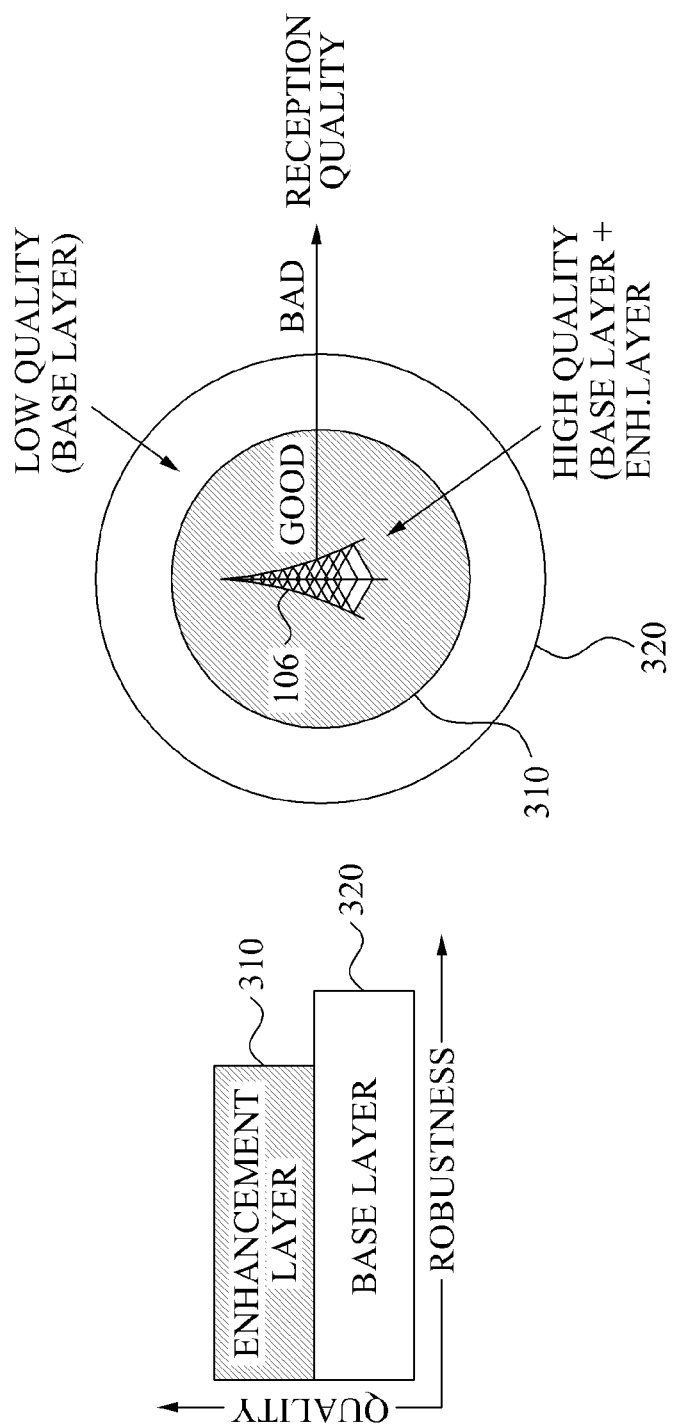
FIG. 3 illustrates a service area of the multi-dimensional layered modulation transmitting apparatus for each layer according to an embodiment of the present invention.

FIG. 3 illustrates a service area of a multi-dimensional layered modulation transmitting apparatus for each layer according to an embodiment of the present invention. In FIG. 3, examples of transmission and reception of a scalable video coding (SVC) scheme are provided.

Referring to FIG. 3, when a base layer 320 as a layer for basic data and an enhancement layer 310 as a layer for quality improvement are transmitted by being superposed on each other, terminals placed within a range/distance of about 80% away from a base station that is the transmitting apparatus 100 may reliably receive both the base layer 320 and the enhancement layer 310 and thus, may receive a 3D or high quality video image. However, terminals within a range/distance of about 20% near to an outline of the base station, that is, terminals at a cell edge, may reliably receive only the base layer 320 and thus, may receive a 2D or low quality video image.

Figure 4:
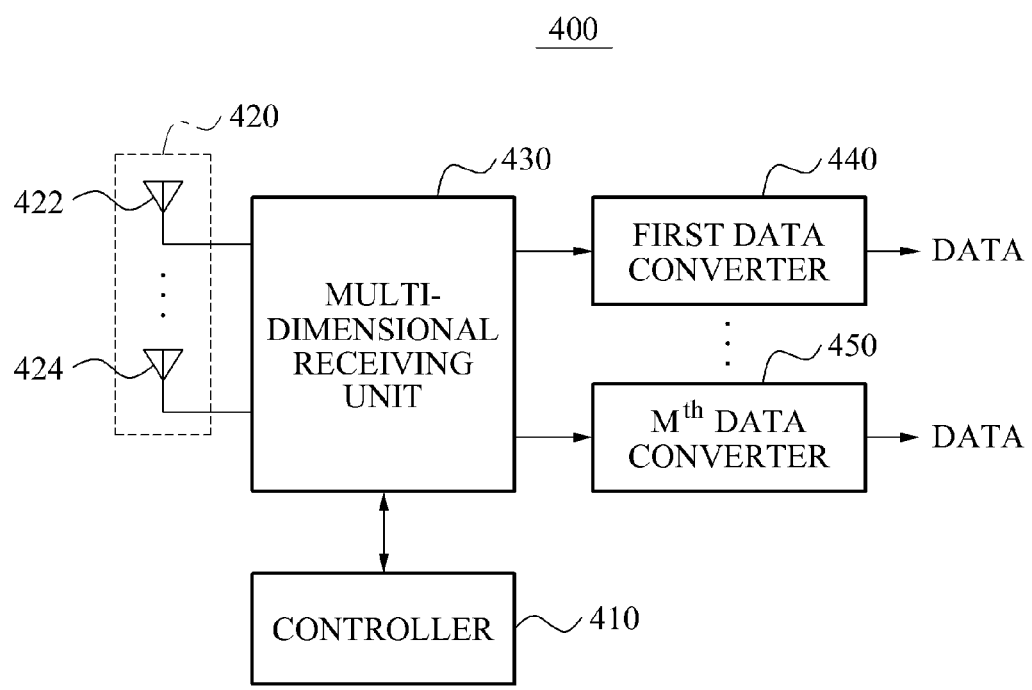
FIG. 4 illustrates a configuration of a multi-dimensional layered modulation receiving apparatus according to an embodiment of the present invention.

FIG. 4 illustrates a configuration of a multi-dimensional layered modulation receiving apparatus according to an embodiment of the present invention.

Referring to FIG. 4, a multi-dimensional layered modulation receiving apparatus 400 may include a controller 410, a multi-antenna 420, a multi-dimensional receiving unit 430, a first data converter 440, and an $M^{th}$ data converter 450.

The controller 410 may determine a signal strength of a received signal, a performance, and a power mode, and may determine a service image corresponding to the signal strength of the received signal, the performance, and the power mode, and may determine a dimension corresponding to the service image.

The multi-dimensional receiving unit 430 may receive stream data of the dimension determined by the controller 410. In this example, the multi-dimensional receiving unit 430 may distinguish a dimension of a divided space through antennas 422 and 424 included in the multi-antenna 420, and may distinguish a dimension of a divided time based on a time when the stream data is received.

The data converters 440 and 450 may convert the received stream data to data.

Figure 5:
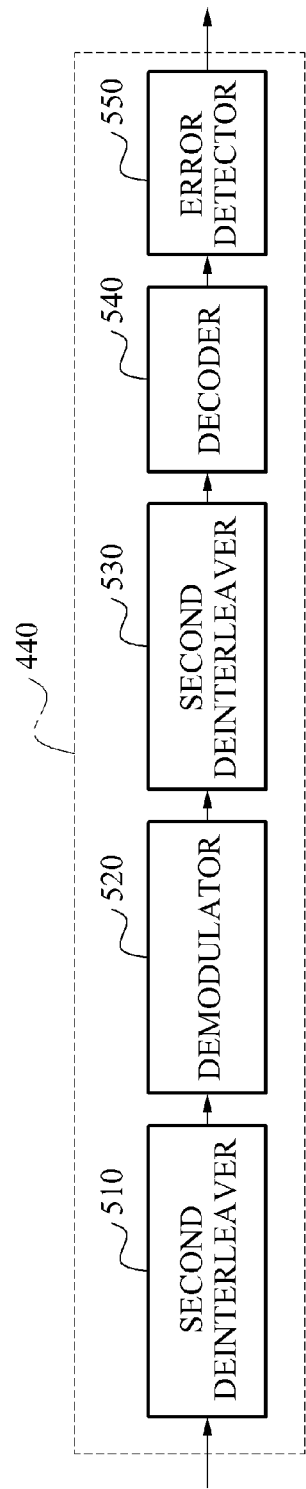
FIG. 5 illustrates a configuration of a data converter in the multi-dimensional layered modulation receiving apparatus according to an embodiment of the present invention.

The data converters 440 and 450 may be configured as shown in FIG. 5.

FIG. 5 illustrates a configuration of a data converter in a multi-dimensional layered modulation receiving apparatus according to an embodiment of the present invention.

Referring to FIG. 5, the data converter 440 includes a second deinterleaver 510, a demodulator 520, a first deinterleaver 530, a decoder 540, and an error detector 550.

The second deinterleaver 510 may deinterleave stream data that is interleaved based on a symbol unit to reduce a burst error.

The demodulator 520 may demodulate, to data, a symbol mapped to a complex number plane.

The first deinterleaver 530 may deinterleave the data that is interleaved based on a bit unit to reduce a burst error.

The decoder 540 may decode the data received from the first deinterleaver 530.

The error detector 550 may correct an error by determining a CRC included in the decoded data.

Hereinafter, when the transmitting apparatus 100 transmits a parallel data signal, for example, an SVC signal, a multi-view video coding (MVC) signal, and the like, by mapping the parallel data signal in an optimal condition, reception in the receiving apparatus 400 based on a condition of the receiving apparatus 400 will be described with reference to FIG. 6.

Figure 6:
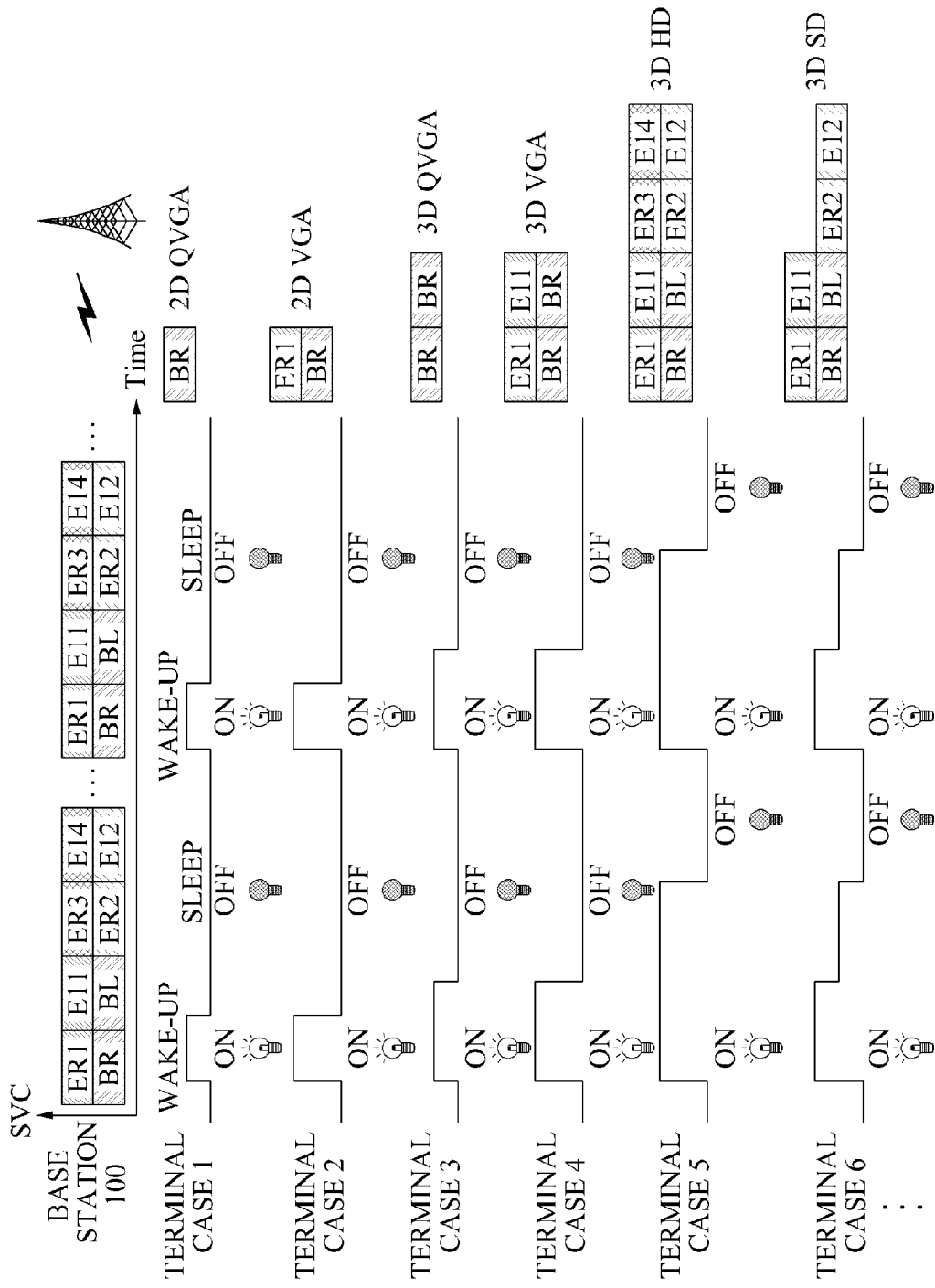
FIG. 6 illustrates an example of receiving multi-dimensional data in a multi-dimensional layered modulation receiving apparatus based on a condition according to an embodiment of the present invention.

FIG. 6 illustrates an example of receiving multi-dimensional data in a multi-dimensional layered modulation receiving apparatus based on a condition according to an embodiment of the present invention.

Referring to FIG. 6, a process that transmits a parallel data signal, for example, an SVC signal, an MVC signal, and the like, by simultaneously mapping the parallel data signal with a complex number plane and a sixteen-dimensional (16D) time. In this example, the 16D time denotes $2^4=16$ and thus, mapping is performed based on four time slices as a unit, each time slice is configured as a 2D complex number plane. Therefore, thirty two-dimensional (32D) signal transmission is performed in FIG. 6, and when a number of transmission and reception antennas increases, a spatial dimension may be added and thus, a higher-dimensional signal may be created.

Referring to FIG. 6, in a transmission signal from a transmitting apparatus, two data streams are superposed on each other in the 2D complex number plane, and four time slices are transmitted as a unit.

In FIG. 6, Br denotes right view data of a base layer, Bl denotes left view data of the base layer, Er1 denote right view data of an enhancement layer 1, El1 denotes left view data of the enhancement layer 1, Er2 and El2 denote right view data and left view data of an enhancement layer 2, respectively, and Er3 and El3 denote right view data and left view data of an enhancement layer 3, respectively.

Conditions of terminals of FIG. 6 are as shown in Table 1.

TABLE 1

| Terminal cases | Position | Power mode | Display performance |
| --- | --- | --- | --- |
| 1 | Cell edge | Power saving | 2D QVGA |
| 2 | Cell center | Power saving | 2D VGA |
| 3 | Cell edge | Power consuming | 3D QVGA |
| 4 | Cell center | Power consuming | 3 VGA |
| 5 | Cell center | Power consuming | 3D HD |
| 6 | Cell edge | Power consuming | 3D SD |

As shown in FIG. 6, a quality of an image provided by the receiving apparatus 400 may change based on a signal strength of a received signal, the performance, and the power mode of the receiving apparatus 400.

A harmonic signal may not be transferred to a cell edge of the base station, and this drawback may be overcome through a relay.

Figure 7:
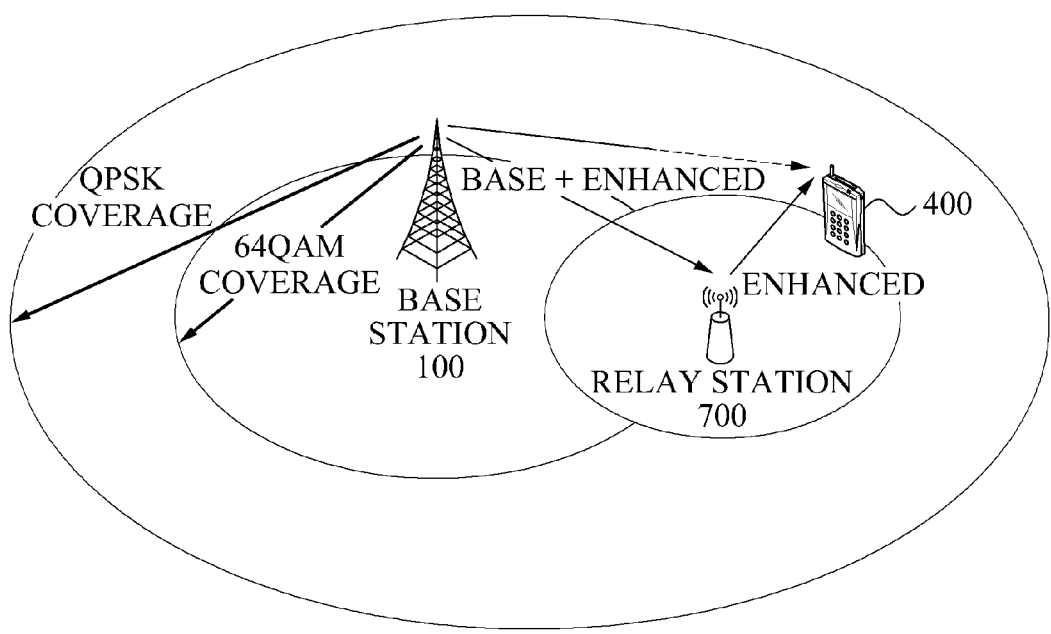
FIG. 7 illustrates an example of transmitting multi-dimensional data through a relay according to an embodiment of the present invention.

FIG. 7 illustrates an example of transmitting multi-dimensional data through a relay according to an embodiment of the present invention.

Referring to FIG. 7, the receiving apparatus 400 placed in a cell edge may receive a signal of an enhancement layer through a relay 700.

In this example, types of the relay 700 may include a full duplex relay or a half duplex relay. When the full duplex relay is used, the receiving apparatus 400 may be provided with the same service as when the receiving apparatus 400 are placed at a center of the cell.

However, when the half duplex relay is used, the receiving apparatus 400 may not be provided with the same service as the case at the center of the cell.

Figure 8:
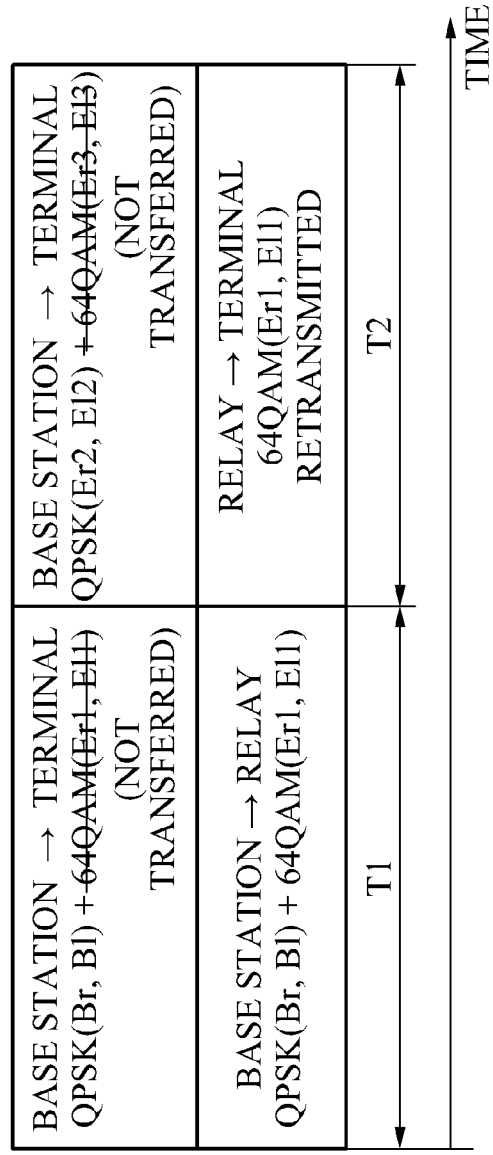
FIG. 8 illustrates an example of transmitting multi-dimensional data through a relay over time according to an embodiment of the present invention.

When the half duplex relay is used, the receiving apparatus 400 placed at the cell edge may receive a signal as shown in FIG. 8.

FIG. 8 illustrates an example of transmitting multi-dimensional data through a relay over time according to an embodiment of the present invention.

During a time period T1, a base station that performs as a transmitting apparatus may transmit only a base layer to a terminal placed at a cell edge, and may transmit both the base layer and an enhancement layer 1 to the relay.

During a time period T2, the base station may transmit only an enhancement layer 2 to the terminal placed at the cell edge, and the relay may transmit the enhancement layer 1 received from the base station during the time period T1 to the terminal placed at the cell edge. Therefore, the terminal placed at the cell edge may service an image based on the base layer, the enhancement layer 1, and the enhancement layer 2.

A multi-dimensional layered modulation transmitting and receiving method for stereoscopic 3D video data according to embodiments of the present invention will be described with reference to drawings.

FIG. 9 illustrates a flowchart that describes a process of transmitting multi-dimensional data in a multi-dimensional layered modulation transmitting apparatus according to an embodiment of the present invention.

Referring to FIG. 9, the transmitting apparatus may generate multi-dimensional data to be transmitted in a multi-dimension in operation 910. In this example, the multi-dimensional data may include at least one 2D view data and at least one depth map data. Also, at least one of the multi-dimensional data is data of a base layer and remaining data is data of an enhancement layer.

In operation 912, the transmitting apparatus may insert a CRC code to data for each dimension.

In operation 914, the transmitting apparatus may encode the CRC-inserted data for each dimension.

In operation 916, the transmitting apparatus may perform bit-interleaving of the encoded data for each dimension.

In operation 918, the transmitting apparatus may modulate the bit-interleaved data for each dimension by mapping the bit-interleaved data to a constellation coordinate for each dimension.

In operation 920, the transmitting apparatus may perform symbol-interleaving of the modulated data for each dimension.

In operation 922, the transmitting apparatus may generate a plurality of stream data by amplifying the symbol-interleaved data for each dimension.

In operation 924, the transmitting apparatus may transmit the plurality of stream data by mapping the plurality of stream data to dimensions divided based on a time and a space, respectively. In this example, the transmitting apparatus may divide a time by changing a time of data transmission, may divide a space by changing an antenna of data transmission, and may transmit the plurality of stream data by mapping the plurality of stream data to the dimensions, respectively.

FIG. 10 illustrates a flowchart that describes a process of receiving multi-dimensional data in a multi-dimensional layered modulation receiving apparatus according to an embodiment of the present invention.

Referring to FIG. 10, the receiving apparatus may determine a signal strength of a received signal in operation 1010. That is, the receiving apparatus may determine a condition of a channel that receives multi-dimensional stream data.

In operation 1012, the receiving apparatus may determine a performance of a terminal that performs as the receiving apparatus. That is, the receiving apparatus may determine a quality of an image that the receiving apparatus is able to service.

In operation 1014, the receiving apparatus may determine a set power mode. In this example, the power mode may be determined based on an amount of power consumption.

In operation 1016, the receiving apparatus may determine a service image corresponding to the signal strength of the received signal, the performance, and the power mode, and may determine a dimension corresponding to the service image.

In operation 1018, the receiving apparatus may receive stream data of the determined dimension among the multi-dimensional stream. In this example, at least one of the multi-dimensional received stream is data of a base layer, and remaining data is data of an enhancement layer.

In operation 1020, the receiving apparatus may convert stream data received for each dimension to data.

The method according to the above-described embodiments of the present invention may be recorded in non-transitory computer readable media including program instructions to implement various operations embodied by a computer. The media may also include, alone or in combination with the program instructions, data files, data structures, and the like. The program instructions recorded in the media may be designed and configured for the present invention or may already be used since it is known by those skilled in the computer software field.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A multi-dimensional layered modulation transmitting apparatus for stereoscopic three-dimensional (3D) video data, the apparatus comprising:
   a data generating unit to generate multi-dimensional data;
   a stream generating unit to perform mapping of the multi-dimensional data to a complex number plane, and to convert the mapped multi-dimensional data to a plurality of stream data, respectively; and
   a multi-dimensional transmitting unit to perform mapping of the plurality of stream data to dimensions divided based on a time and a space, respectively, and to transmit the plurality of mapped stream data,
   wherein the multi-dimensional data comprises at least one two-dimensional (2D) view data, and
   wherein the stream generating unit comprises:
   a cyclic redundancy check (CRC) inserting unit to insert a CRC code to data for each dimension;
   an encoder to encode the CRC-inserted data for each dimension;
   a modulator to modulate the data for each dimension by mapping the encoded data to a constellation coordinate for each dimension; and
   an amplifier to amplify the modulated data for each dimension so as to generate the plurality of stream data.

2. The apparatus of claim 1, wherein the multi-dimensional data comprises at least one depth map data.

3. The apparatus of claim 1, wherein at least one of the multi-dimensional data is data of a base layer, and remaining data is data of an enhancement layer.

4. The apparatus of claim 1, wherein the multi-dimensional transmitting unit divides a time by changing a time of data transmission, divides a space by changing an antenna for data transmission, and transmits the plurality of stream data by mapping the plurality of stream data to the dimensions, respectively.

5. The apparatus of claim 1, further comprising:
a first interleaver to perform interleaving of the encoded data for each dimension,
wherein the modulator modulates the interleaved data for each dimension by mapping the interleaved data to the constellation coordinate for each dimension.

6. The apparatus of claim 1, further comprising:
a second interleaver to perform interleaving of the modulated data for each dimension,
wherein the amplifier amplifies the interleaved data for each dimension so as to generate the plurality of stream data.

7. A multi-dimensional layered modulation transmitting method for stereoscopic three-dimensional (3D) video data, the method comprising:
generating multi-dimensional data;
converting the multi-dimensional data to a plurality of stream data by mapping the multi-dimensional data to a complex number plane; and
transmitting the plurality of stream data by mapping the plurality of stream data to dimensions divided based on a time and a space, respectively;
wherein the multi-dimensional data comprises at least one two dimensional (2D) view data, and
wherein the converting comprises:
inserting a cyclic redundancy check (CRC) code to data for each dimension;
encoding the CRC-inserted data for each dimension;
modulating the encoded data by mapping the encoded data to a constellation coordinate for each dimension; and
amplifying the modulated data for each dimension so as to generate the plurality of stream data.

8. The method of claim 7, wherein the multi-dimensional data comprises at least one depth map data.

9. The method of claim 7, wherein at least one of the multi-dimensional data is data of a base layer, and remaining data is data of an enhancement layer.

10. The method of claim 7, wherein the transmitting comprises:
dividing a time by changing a time of data transmission, dividing a space by changing an antenna for data transmission, and transmitting the plurality of stream data by mapping the plurality of stream data to the dimensions, respectively.

11. The method of claim 7, wherein, after the encoding, the method further comprises:
interleaving the encoded data for each dimension,
wherein the modulating comprises:
modulating the interleaved data for each dimension by mapping the interleaved data to the constellation coordinate for each dimension.

12. The method of claim 7, wherein, after the modulating, the method further comprises:
interleaving the modulated data for each dimension,
wherein the amplifying comprises:
amplifying the interleaved data for each dimension so as to generate the plurality of stream data.

\* \* \* \* \*